United States Patent [19]

Strange et al.

[11] Patent Number: 4,639,827

[45] Date of Patent: Jan. 27, 1987

[54] PRESSURE SENSITIVE FAULT INTERRUPTER FOR A MULTI SECTION AC CAPACITOR

[75] Inventors: Thomas F. Strange; John W. Carino, both of Columbia, S.C.

[73] Assignee: North American Philips Corporation, New York, N.Y.

[21] Appl. No.: 802,782

[22] Filed: Nov. 27, 1985

[51] Int. Cl.[4] .............................................. H01G 1/06
[52] U.S. Cl. ................................................... 361/272
[58] Field of Search ................................ 361/327–331, 361/272, 275, 433 T, 433 V, 433 H, 433 W, 15

[56] References Cited

U.S. PATENT DOCUMENTS

| | | | |
|---|---|---|---|
| 4,398,782 | 8/1983 | Markarian | 361/306 X |
| 4,577,257 | 3/1986 | Erhardt et al. | 361/272 |
| 4,586,107 | 4/1986 | Price | 361/272 |

FOREIGN PATENT DOCUMENTS 2336727  2/1975  Fed. Rep. of Germany ...... 361/275

*Primary Examiner*—Donald A. Griffin
*Attorney, Agent, or Firm*—Jack E. Haken; James J. Cannon, Jr.

[57] ABSTRACT

A multisection AC capacitor wherein each capacitor section has a pressure sensitive fault interrupter having a dome-shaped diaphragm mechanically and electrically secured to a contact bridge at the base of the capacitor roll, all capacitor sections within said case being electrically connected in parallel, such that a rising pressure within one section will cause the dome of the diaphragm of the faulty capacitor to be depressed, thereby breaking the electrical contact of one electrode, thus isolating the faulty capacitor from the power supply, while permitting the remaining capacitors in the multisection unit to function normally.

6 Claims, 2 Drawing Figures

PRESSURE SENSITIVE FAULT INTERRUPTER FOR A MULTI SECTION AC CAPACITOR

This application is related to U.S. patent application Ser. No. 749,615, filed June 27, 1985, entitled Pressure Sensitive Fault Interrupter, Thomas F. Strange and John W. Carino inventors, and assigned to the assignee of the present invention.

BACKGROUND OF THE INVENTION

1. Field of the Invention

The invention pertains to the field of dry metallized film AC motor start and motor run capacitors and in particular to dry metallized polypropylene capacitors having a pressure sensitive fault interrupter.

2. Description of the Prior Art

There is virtually no known prior art either in printed literature or commercially available products in the area of dry metallized film capacitors having fault interrupters.

British Pat. No. 1,569,186 discloses a film capacitor in which a capacitor roll deforms when heated, breaking a contact. It is unclear whether a dry or wet capacitor is intended. The problem with this device is that by the time the internal temperature is high enough to deform the film roll, some other interruption would have occurred, such as an explosion.

U.S. Pat. No. 3,496,432 also pertains to a dry capacitor relying on temperature to break a contact.

U.S. Pat. No. 3,909,683 teaches a pressure sensitive fault interrupter in a dry film capacitor. It provides a yielding cavity with a fusible portion of one lead wire passing therethrough. In the event of over pressure caused by a fault, at least one contact bridge is separated. Unfortunately, gases can accumulate in the cavity and can be ignited by the breaking contact. Such a type of device tends to be unsafe for commercial use.

No dry film capacitors with fault interrupters are commercially available, indicating that the few devices disclosed in the patent literature having no commercial value, despite the proposed UL requirement in Capacitor-UL-810.

The literature on wet film capacitors with fault interrupters is extensive. Typical recent U.S. patents are U.S. Pat. Nos. 4,398,782 and 4,454,561. In particular, U.S. Pat. No. 4,398,782 is an interrupter for a wet film multi-section AC capacitor in which a molded disc with ribs is utilized.

SUMMARY OF THE INVENTION

This invention pertains to a multisection metallized film AC motor start or motor run capacitor having a pressure sensitive fault interrupter. A multisection capacitor is a unit with two or more discrete capacitors electrically connected within a housing or case. In the present invention the multiple discrete capacitor sections are electrically connected in parallel. Consequently the purpose of the fault interrupter is that during a fault, only the faulty capacitor section within the multisection capacitor unit will be isolated, leaving the other capacitor sections to function. A fault is defined as a complete or partial short between the terminals of the capacitor section and internal to the capacitor section foil roll. When a fault occurs, pressure is developed within the foil roll as a result of the breakdown of the dielectric, producing various gases. These gases are able to exit any one foil roll at its ends only. The purpose of the present invention is to utilize this pressure developed at one end of the roll or any part thereof to depress a diaphragm located at one end of the capacitor and attached electrically and mechanically to said capacitor so that the individual capacitor is isolated from the circuit means, thus preventing further action within the roll and in the case of the present invention within the multisection capacitor unit itself.

A pressure sensitive fault interrupter is preferred to a temperature sensitive or temperature dependent fault interrupter because when a short does occur, the pressure within a capacitor will rise significantly faster than the temperature. In many prior art dry film fault interrupter signs, the rapidly rising pressure will cause an explosion before a temperature sensitive interrupter is activated.

In a typical dry metallized AC motor run capacitor, the ends of the capacitor roll are schooped or end-sprayed with tin, zinc, or another metal, to form a contact bridge. In the present invention a dome-shaped diaphragm of suitable size and material is electrically and mechanically attached to the contact bridge at one end of each schooped capacitor roll and the tab for that electrode is connected to the diaphragm. A plurality of these assemblies are then connected in parallel and the assembled devices are then placed in a case or a housing such that the dome-shaped diaphragm comes in physical contact about its perimeter with one side or base of said housing. A suitable potting agent is used to encapsulate all the capacitors, including their parallel connections, holding each capacitor roll fixed with respect to its domed diaphragm and maintaining an air gap between the housing and the reverse side of the domed diaphragm. Thus, a plurality of capacitor sections connected in parallel are placed within a single housing. Each diaphragm must be able to move relative to the fixed roll to which it is attached such that the maximum possible travel of the diaphragm results in the breaking the connection to the capacitor roll with no possible restrike after 48 hours, but both the foil roll and the diaphragm must remain within the confines of the case or housing. Interruption must occur before flame or molten material can exit the case or its cover.

In the preferred embodiment, the diaphragm is a domed metallic disc which permits flexing under pressure, the side of the dome being connected or welded to one electrode path connection, and the assembly is potted in polyurethane. When pressure builds up within one individual device any one individual device or capacitor foil roll within the device, the dome-shaped diaphragm of that roll goes from concave to convex, pulling away from the contact bridge. This isolates only the faulty capacitor, leaving the others to function, and prevents any further action within the affected capacitor roll.

DESCRIPTION OF THE PREFERRED EMBODIMENT

Figure 1:
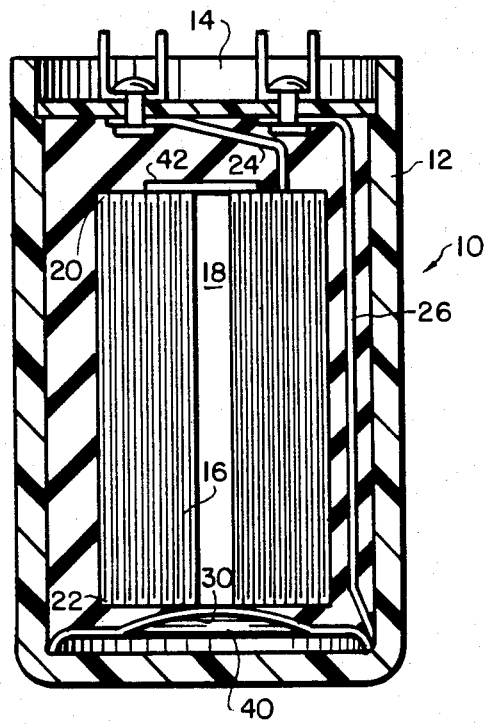
FIG. 1 is a cross sectional view of a dry metallized film AC motor run capacitor with a pressure sensitive fault interrupter of the present invention in place.
Figure 2:
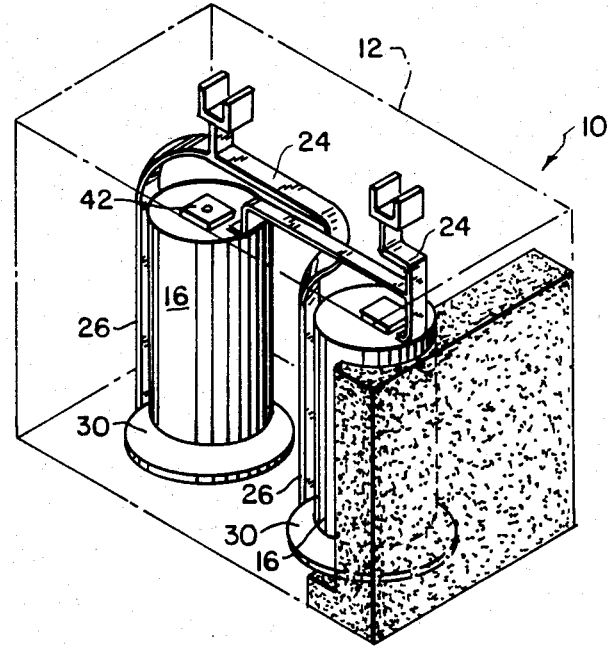
FIG. 2 is a partially cut away perspective view of a multisection metallized film AC capacitor according to the present invention.

FIG. 1 illustrates a dry metallized film AC motor start or motor run capacitor in the construction shown in the cross-referenced application. Capacitor 10 has a dry metallized film capacitor section or roll 16 wound on a central arbor, thereby leaving a central core 18. Capacitor section 16 has been metallic contact bridges 20, 22 schooped or end-sprayed on each end of the foil roll, each bridge making contact with only one of the electrodes. Typically, lead wires or tabs 24, 26 are electrically and mechanically secured to these bridges. As explained below, one lead is connected differently for the fault interrupter. The capacitor section and the leads are typically potted in place within a housing 12.

FIG. 1 also shows the pressure sensitive fault interrupter of the cross-referenced application in an operational condition installed in a typical AC motor run capacitor. The purpose of the fault interrupter of the present invention is to isolate the faulty dry metallized film capacitor section of a multisection AC capacitor from a power source when one capacitor section has developed a complete or partial short between the terminals of the capacitor section and internal to the capacitor section roll. During such a fault, between the terminals of capacitor roll 16 and internal to the capacitor foil roll, pressure is developed within the roll as a result of the breakdown of the dielectric, producing various gasses. These gasses are able to exit the roll at its ends only. The fault interrupter of the present invention utilizes the pressure developed at either end of the roll or any part thereof to break a contact as follows. A diaphragm 30 of suitable size and material and having a dome shape is mechanically and electrically attached to the contact bridge 22 at the base of the capacitor roll 16, and the electrode tab is connected to the diaphragm 30. The assembled device is then placed in case 12 such that the perimeter edge of the dome diaphragm 30 maintains full contact with the case and an air gap 40 or void is left underneath the dome. The electrode tabs of the various capacitor sections for the multisection AC capacitor are then connected to one another such that the plurality of capacitors within the case are connected in parallel, each electrode connection going to a proper terminal on the cover 14 of the case 12. After each of the capacitor sections 16 with diaphragms 30 attached are placed in the case, a suitable potting material, preferably polyurethane, is poured into the case so that all the units are encapsulated and all the capacitor section rolls are held fixed with respect to their diaphragms. Since the perimeter edge of each diaphragm 30 is in firm contact with the base of the case, the potting material does not penetrate the void 40 beneath the diaphragm 30. The top of the core 18 of each of the individual capacitor rolls is sealed with a tape 42 to prevent the entry of potting material into core 18 of each capacitor roll and to prevent the escape of gasses through the top of the capacitor roll. Consequently the only void space within the unit is a core 18 of each of the individual capacitors and the space 40 beneath each individual dome-shaped diaphragm. Thus, the void spaces serve to direct the flow of gasses toward the diaphragm.

When a fault occurs, the gasses will fill core 18 of the capacitor section roll or rolls affected and exert downward pressure on diaphragm 30 of the affected roll, depressing it from a concave shape to a convex shape, thereby pulling the dome-shaped diaphragm away from bridge 22, which is the schooped base of a capacitor section 16. Thus, the action of depressing the diaphragm 30 breaks the electrical contact of the faulty capacitor roll and its tab 26, which isolates this capacitor section roll 16 from the power supply and stops further reaction within the roll. However, only the faulty capacitor section is isolated, thereby leaving the others to function.

The diaphragm 30 must be able to move relative to the fixed section 16 such that the maximum possible travel of the diaphragm 30 results in breaking the connection between the tab 26 and the bridge 22 with no possible restrike within 48 hours, but both the capacitor roll and the dome must remain within the case 12. With a fault interrupter of the present invention, the interruption will occur before flame or molten material can exit case 12.

The pressure required to operate the fault interrupter can be between 5 and 100 p.s.i. The roll 16 can be from 0.75 inches to 3 inches in diameter. The diaphragm 30 can be made from steel, aluminum or any other material that would provide the action required. The attachment of the fault interrupter to the bridge 22 of the capacitor roll 16 can be made by connection to tab 26 or by direct connection to the schooped end, bridge 22, of capacitor roll 16.

The fault interrupter of the present invention differs significantly from and has many advantages over the prior art. It uses only normal connections; no special connections are required. It is a simple external device. No special case is required. The case does not require a special hermetic seal. The device works with fully encapsulated capacitor rolls, without requiring case dimensions to change in order to interrupt a circuit. A fault does not result in deformation of the case.

We claim:

1. A multisection AC capacitor having pressure sensitive fault interrupters on each of its capacitor sections, for use as dry metallized film AC motor start or motor run capacitors, wherein said multisection capacitor includes a plurality of metallized foil capacitor sections, each section having a void core, a contact bridge for each electrode of each capacitor section, one contact bridge being on each end of each capacitor section, connecting tabs to said contact bridges, said capacitor sections within said multisection capacitor being connected in parallel through said connecting tabs, a case, potting material securing said capacitor sections and their parallel connections within said case, and connecting terminals for said electrode tabs in a cover for said case, wherein the fault interrupter for each of said capacitor sections comprises:

a diaphragm mechanically and electrically attached to the contact bridge at the base end of said capacitor section;

a tab connection for one electrode from said diaphragm to one of said connecting terminals;

a plug in a form of a tape positioned over the upper end of said core;

said capacitor section with said diaphragm connected thereto being positioned within said case, such that the perimeter of said diaphragm is in firm contact with the base of said case and a void space is left beneath said diaphragm to permit a movement thereof;

a potting material disposed around said capacitor roll within said case such that said capacitor roll and the parallel electrical connections between said capacitor section and at least a second capacitor section is firmly sealed within said case; and said diaphragm being secured to the bottom of said capacitor roll within said case such that, when a fault occurs, said diaphragm is depressed by gaseous pressure from within its core to break the electrical contact between said diaphragm and its contact bridge, thereby electrically isolating the faulty capacitor section, while leaving the other capacitor sections within said case to function normally.

2. The capacitor of claim 1 wherein said diaphragm is dome-shaped, having a concave shape in operational condition and a convex shape after depression.

3. The capacitor of claim 1 wherein said diaphragm is metal.

4. The capacitor of claim 1 wherein said diaphragm is steel.

5. The capacitor of claim 1 wherein said potting material is polyurethane.

6. The capacitor of claim 1 wherein each diaphragm is directly connected to one bridge of its capacitor section.

* * * * *